(12) United States Patent
Wang et al.

(10) Patent No.: US 12,410,754 B2
(45) Date of Patent: Sep. 9, 2025

(54) DUAL-FUEL POWER SYSTEM AND AIR SUPPLY AND PURGING METHOD THEREOF

(71) Applicant: YANTAI JEREH PETROLEUM EQUIPMENT & TECHNOLOGIES CO., LTD., Shandong (CN)

(72) Inventors: Jianwei Wang, Shandong (CN); Rikui Zhang, Shandong (CN); Xiaoyu Feng, Shandong (CN); Fuhong Li, Shandong (CN); Peng Zhang, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/774,116

(22) PCT Filed: Feb. 15, 2022

(86) PCT No.: PCT/CN2022/076322
§ 371 (c)(1),
(2) Date: May 3, 2022

(87) PCT Pub. No.: WO2023/155039
PCT Pub. Date: Aug. 24, 2023

(65) Prior Publication Data
US 2024/0175396 A1 May 30, 2024

(51) Int. Cl.
*F02M 37/54* (2019.01)
*F02C 3/22* (2006.01)
(Continued)

(52) U.S. Cl.
CPC .................. *F02C 7/22* (2013.01); *F02C 3/22* (2013.01); *F02C 3/24* (2013.01); *F02C 6/16* (2013.01);
(Continued)

(58) Field of Classification Search
CPC ................ F23D 2209/30; F02M 37/54; F23K 2300/203; F05D 2260/602; F23R 3/36
See application file for complete search history.

(56) References Cited

U.S. PATENT DOCUMENTS

2005/0193741 A1* 9/2005 Lasillo ...................... F02C 3/30
60/776
2012/0232768 A1* 9/2012 Nenmeni ................ F02C 7/232
701/99
(Continued)

FOREIGN PATENT DOCUMENTS

| CN | 106460673 B | 2/2019 |
|---|---|---|
| CN | 112879160 A1 | 6/2021 |
| CN | 214741684 U | 11/2021 |

*Primary Examiner* — Gerald L Sung
*Assistant Examiner* — Jacek Lisowski
(74) *Attorney, Agent, or Firm* — Crowell & Moring LLP

(57) ABSTRACT

A dual-fuel power system and an air supply and purging method thereof are provided. The dual-fuel power system includes a plurality of dual-fuel power devices, a first air compressor and a second air compressor. Each of the plurality of dual-fuel power devices includes a compressed air supply pipeline, a first fuel nozzle and a second fuel nozzle, and the compressed air supply pipelines of the plurality of dual-fuel power devices are connected in sequence. The first air compressor includes a first air storage cylinder connected with the compressed air supply pipeline of any one of the plurality of dual-fuel power devices to supply air to the plurality of dual-fuel power devices; and the second air compressor includes a second air storage cylinder connected with the compressed air supply pipeline of any one of the plurality of dual-fuel power devices to supply air to the plurality of dual-fuel power devices. Thus, the plurality of dual-fuel power devices can be supplied with air through the second air compressor when the air supply from the first air compressor is insufficient.

19 Claims, 4 Drawing Sheets

(51) Int. Cl.
  *F02C 3/24*    (2006.01)
  *F02C 6/16*    (2006.01)
  *F02C 7/22*    (2006.01)
  *F02C 7/236*   (2006.01)
  *F02C 9/40*    (2006.01)

(52) U.S. Cl.
  CPC ............ *F02C 7/236* (2013.01); *F02M 37/54* (2019.01); *F02C 9/40* (2013.01); *F23D 2209/30* (2013.01)

(56) References Cited

U.S. PATENT DOCUMENTS

| | | | |
|---|---|---|---|
| 2016/0061114 A1* | 3/2016 | Guethe | F23N 5/242 60/776 |
| 2016/0230707 A1* | 8/2016 | Tanaka | F02D 41/0235 |
| 2018/0135528 A1* | 5/2018 | Ewens | F02C 7/232 |
| 2020/0032802 A1* | 1/2020 | Mei | F02C 6/16 |
| 2020/0063658 A1* | 2/2020 | Kubo | F02C 7/143 |
| 2021/0025413 A1* | 1/2021 | Wang | H02J 7/34 |

* cited by examiner when any one dual-fuel power plant of the plurality of dual-fuel power devices is started, starting the first air compressor to supply air to the any one dual-fuel power device — S1 when the pressure value of the first air storage cylinder is less than the first predetermined pressure value and the state of being less than the first predetermined pressure value keeps for a predetermined time, starting the second air compressor to supply air to the any one dual-fuel power device — S2

Fig. 5

DUAL-FUEL POWER SYSTEM AND AIR SUPPLY AND PURGING METHOD THEREOF

This application is a U.S. National Phase Entry of International Application No. PCT/CN2022/076322 filed on Feb. 15, 2022, which is herein incorporated by reference in their entirety.

TECHNICAL FIELD

Embodiments of the present disclosure relate to a dual-fuel power system and an air supply and purging method thereof.

BACKGROUND

Turbine engine has the advantages such as small size, light weight, high power and good fuel economy, and is widely used in oil field fracturing equipment. The turbine engine has good fuel compatibility, and diesel, wellhead gas, LNG, CNG and even bio-fuel can be used for driving it. Therefore, most of the turbine engines in fracturing equipment are equipped with diesel/gas dual-fuel supply system, which can realize seamless switching of diesel/gas during fracturing operation.

Two kinds of fuel nozzles are provided in the combustion chamber of the dual-fuel supply system of the turbine engine, and the two kinds of fuel nozzles do not work simultaneously. In order to prevent the fuel nozzles from being ablated and depositing carbon, upon using fuel oil as fuel to supply fuel oil to the combustion chamber through the fuel oil nozzle, the external air compressor needs to provide compressed air with a certain pressure and flow to the fuel gas nozzle for purging. Similarly, upon using fuel gas as fuel to supply fuel gas to the combustion chamber through the fuel gas nozzle, the external air compressor needs to provide compressed air with a certain pressure and flow to the fuel oil nozzle for purging.

SUMMARY

Embodiments of the disclosure provide a dual-fuel power system and an air supply and purging method thereof. For the dual-fuel power system, when any one of the plurality of dual-fuel power devices is started to work, the first air compressor can be started simultaneously to supply air and purging the any one of the dual-fuel power devices. In the case that the first air compressor cannot satisfy the requirements of the air supply pressure value, the second air compressor can be started to carry out the air supply and purging work for the air supply of the any one dual-fuel power device.

At least one embodiment of the disclosure provides a dual-fuel power system, comprising: a plurality of dual-fuel power devices, each of the plurality of dual-fuel power devices comprising a compressed air supply pipeline, a first fuel nozzle and a second fuel nozzle, the compressed air supply pipeline being connected with the first fuel nozzle and the second fuel nozzle, and the compressed air supply pipelines of the plurality of dual-fuel power devices being connected in sequence; a first air compressor, comprising a first air storage cylinder configured to be connected with the compressed air supply pipeline of any one of the plurality of dual-fuel power devices to supply air to the plurality of dual-fuel power devices and purge at least one of the first nozzle and the second nozzle; and a second air compressor, comprising a second air storage cylinder configured to be connected with the compressed air supply pipeline of any one of the plurality of dual-fuel power devices to supply air to the plurality of dual-fuel power devices and purge at least one of the first nozzle and the second nozzle.

For example, in the dual-fuel power system according to an embodiment of the disclosure, the first air compressor and the second air compressor are respectively connected with the compressed air pipelines of a first dual-fuel power device and a last dual-fuel power device of the plurality of dual-fuel power devices connected in sequence.

For example, the dual-fuel power system according to an embodiment of the disclosure further comprises: a control device comprising a first air compressor control module and a second air compressor control module, wherein the first air compressor control module and the second air compressor control module are in communicative connection with each other, the first air compressor control module is in communicative connection with the first air compressor, and is configured to control starting and displacement of the first air compressor; the second air compressor control module is in communicative connection with the second air compressor, and is configured to control starting and displacement of the second air compressor.

For example, in the dual-fuel power system according to an embodiment of the disclosure, the first air compressor control module is configured to control the first air compressor to be started when any one of the plurality of dual-fuel power devices is started, and send a starting signal to the second air compressor control module when a pressure value of the first air storage cylinder is less than a first predetermined pressure value and a state of being less than the first predetermined pressure value keeps for a predetermined time, and the second air compressor control module is configured to control the second air compressor to be started according to the starting signal.

For example, in the dual-fuel power system according to an embodiment of the disclosure, the first air compressor control module is further configured to increase the displacement of the first air compressor to increase the pressure value of the first air storage cylinder when the pressure value of the first air storage cylinder is less than the first predetermined pressure value.

For example, in the dual-fuel power system according to an embodiment of the disclosure, the second control compressor control module is further configured to increase the displacement of the second air compressor to increase a pressure value of the second air storage cylinder when the second air compressor has been started and the pressure value of the second air storage cylinder is less than the first predetermined pressure value.

For example, in the dual-fuel power system according to an embodiment of the disclosure, the first air compressor control module is further configured to reduce the displacement of the first air compressor to reduce the pressure value of the first air storage cylinder when the pressure value of the first air storage cylinder is greater than a second predetermined pressure value; and/or, the second air compressor control module is configured to reduce the displacement of the second air compressor to reduce the pressure value of the second air storage cylinder when the pressure value of the second air storage cylinder is greater than the second predetermined pressure value, the second predetermined pressure value is greater than or equal to the first predetermined pressure value.

For example, in the dual-fuel power system according to an embodiment of the disclosure, the control device further comprises a nozzle purging control module, and each of the plurality of dual-fuel power devices comprises a first valve and a second valve, the first valve is located between the first fuel nozzle and the compressed air supply pipeline, the second valve is located between the second fuel nozzle and the compressed air supply pipeline, the nozzle purging control module is in communicative connection with the plurality of dual-fuel power devices and configured to control opening and closing of the first valve and the second valve.

For example, in the dual-fuel power system according to an embodiment of the disclosure, the nozzle purging control module is configured to control the first valve to close and the second valve to open so as to purge the second fuel nozzle when the first fuel nozzle supplies fuel gas; the nozzle purging control module is configured to control the first valve to open and the second valve to close so as to purge the first fuel nozzle when the second fuel nozzle supplies fuel gas.

For example, in the dual-fuel power system according to an embodiment of the disclosure, when any one dual-fuel power device of the plurality of dual-fuel power devices receives a shutdown command and is in a low-load operation state, the nozzle purging control module is configured to control the opening of the first valve and the second valve of the any one dual-fuel power device to purge the first fuel nozzle and the second fuel nozzle simultaneously.

For example, in the dual-fuel power system according to an embodiment of the disclosure, the nozzle purging control module is further configured to control the first valve and the second valve of the any one dual-fuel power device to close so as to stop purging the first fuel nozzle and the second fuel nozzle when an exhaust temperature of the any one dual-fuel power device is less than a predetermined temperature.

For example, in the dual-fuel power system according to an embodiment of the disclosure, each of the plurality of dual-fuel power devices further comprises an electric power supply circuit, an oil supply pipeline and an oil return pipeline; the first air compressor further comprises a first electric power supply circuit, a first oil supply pipeline and a first oil return pipeline, and the first electric power supply circuit, the first oil supply pipeline and the first oil return pipeline are respectively connected with the electric power supply circuit, the oil supply pipeline and the oil return pipeline of any one dual-fuel power device of the plurality of dual-fuel power devices; and/or, the second air compressor further comprises a second electric power supply circuit, a second oil supply pipeline and a second oil return pipeline, and the second electric power supply circuit, the second oil supply pipeline and the second oil return pipeline are respectively connected with the electric power supply circuit, the oil supply pipeline and the oil return pipeline of any one dual-fuel power device of the plurality of dual-fuel power devices.

For example, in the dual-fuel power system according to an embodiment of the disclosure, the dual-fuel power device is a turbine engine.

At least one embodiment of the disclosure provides an air supply and purging method of dual-fuel power system, the dual-fuel power system including the dual-fuel power system according to any items as mentioned above. The air supply and purging method comprises: when any one dual-fuel power device of the plurality of dual-fuel power devices is started, starting the first air compressor to supply air to the any one dual-fuel power device; and when a pressure value of the first air storage cylinder is less than the first predetermined pressure value and a state of being less than the first predetermined pressure value keeps for a predetermined time, starting the second air compressor to supply air to the any one dual-fuel power device.

For example, the air supply and purging method according to an embodiment of the disclosure further comprises: when the pressure value of the first air storage cylinder is less than the first predetermined pressure value, increasing displacement of the first air compressor so as to increase the pressure value of the first air storage cylinder.

For example, the air supply and purging method according to an embodiment of the disclosure further comprises: when the second air compressor has been started and a pressure value of the second air storage cylinder is less than the first predetermined pressure value, increasing displacement of the second air compressor so as to increase the pressure value of the second air storage cylinder.

For example, the air supply and purging method according to an embodiment of the disclosure further comprises: when the pressure value of the first air storage cylinder is greater than a second predetermined pressure value, reducing the displacement of the first air compressor so as to reduce the pressure value of the first air storage cylinder; and/or, when the pressure value of the second air storage cylinder is greater than the second predetermined pressure value, reducing the displacement of the second air compressor so as to reduce the pressure value of the second air storage cylinder.

For example, the air supply and purging method according to an embodiment of the disclosure further comprises: when any one dual-fuel power device of the plurality of dual-fuel power devices provides fuel through the first fuel nozzle, purging the second fuel nozzle of the any one dual-fuel power device; when any one dual-fuel power device of the plurality of dual-fuel power devices provides fuel through the second fuel nozzle, purging the first fuel nozzle of the any one dual-fuel power device.

For example, the air supply and purging method according to an embodiment of the disclosure further comprises: when any one dual-fuel power device of the plurality of dual-fuel power devices receives a shutdown command and is in a low-load operation state, purging the first fuel nozzle and the second fuel nozzle of the any one dual-fuel power device simultaneously.

For example, the air supply and purging method according to an embodiment of the disclosure further comprises: when an exhaust temperature of any one dual-fuel power device of the plurality of dual-fuel power devices is less than or equal to a predetermined temperature, stopping purging the first fuel nozzle and the second fuel nozzle of the any one dual-fuel power device.

BRIEF DESCRIPTION OF THE DRAWINGS

In order to more clearly illustrate the technical solution of the embodiments of the present disclosure, the drawings of the embodiments will be briefly described in the following. It is obvious that the described drawings below are only related to some embodiments of the present disclosure without constituting any limitation thereto.

FIG. 5 is a schematic diagram of an air supply and purging method of a dual-fuel power system according to an embodiment of the present disclosure.

DETAILED DESCRIPTION

Figure 1:
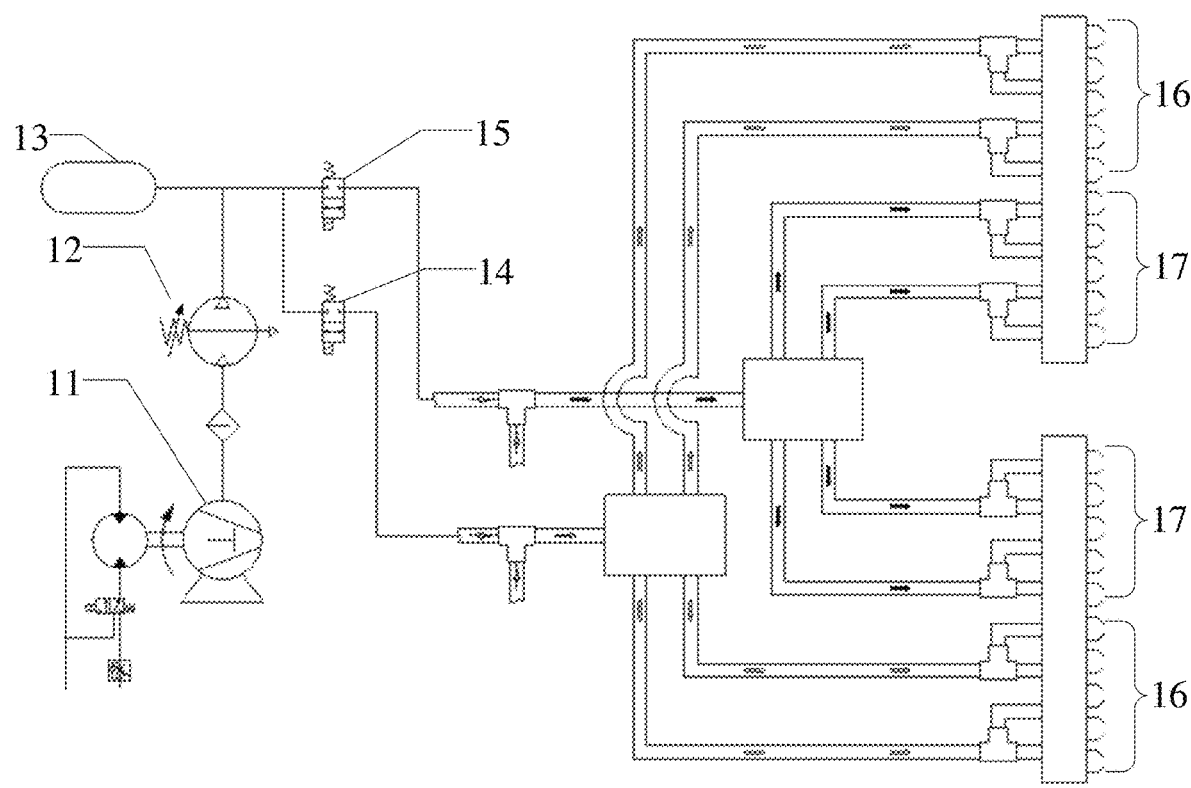
FIG. 1 is a schematic diagram of a dual-fuel power system.

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise specified, the technical terms or scientific terms used in the disclosure have normal meanings understood by those skilled in the art. The words "first", "second" and the like used in the disclosure do not indicate the sequence, the number or the importance but are only used for distinguishing different components. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

The components or structures in the drawings are not drawn strictly to scale, and the dimensions of each component or structure may be exaggerated or reduced for clarity, but these shall not be used to limit the scope of the present disclosure. In order to keep the following description of the embodiments of the present disclosure clear and concise, the detailed description of known functions and known components may be omitted.

Usually, the turbine engines used for fracturing equipment are equipped with an independent air compressor for each turbine engine, and the compressed air is stored in an air storage cylinder to be used by a turbine engine purging system. The air compressor is driven by a hydraulic motor, a rotational speed of which can be adjusted, and an on-off state of an oil supply circuit of the hydraulic motor is controlled by an electromagnetic valve; when the electromagnetic valve is energized, the air compressor starts working, and when the electromagnetic valve is de-energized, the air compressor stops working. Before starting the turbine engine every time, it is necessary to start the air compressor in advance to inflate the air storage cylinder to prepare for a fuel nozzle purging. Generally, requirements of the turbine engine for an air source of a purging system are: compressed air flow of 5 cubic feet per minute (CFM) and air supply pressure of 200 pounds per square inch (PSI). The purging on the fuel nozzle by compressed air is controlled by the pneumatic electromagnetic valve.

FIG. 1 is a schematic diagram of a dual-fuel power system. As illustrated in FIG. 1, the dual-fuel power system includes a piston air compressor 11, a booster valve 12, an air storage cylinder 13, a liquid fuel nozzle electromagnetic valve 14, a gas fuel nozzle electromagnetic valve 15, a liquid fuel nozzle 16 and a gas fuel nozzle 17. The piston air compressor 11 is pressurized by the booster valve 12, and then the compressed air is stored in the air storage cylinder 13. The stored compressed air is controlled by the liquid fuel nozzle electromagnetic valve 14 and the gas fuel nozzle electromagnetic valve 15 to purge the liquid fuel nozzle 16 and the gas fuel nozzle 17, respectively.

Because the maximum discharge pressure of the common piston air compressor 11 is about 100 PSI, it can't meet the pressure requirement of the purging system of dual-fuel power device; therefore, when the piston air compressor 11 is used to provide air source for the purging system of dual-fuel power device, the additional booster valve 12 is required. The function of the booster valve 12 is to pressurize a lower pressure air proportionally, and then the compressed air is stored in the air storage cylinder 13 for the purging system of dual-fuel power device such as turbine engine. However, in the field application process, the performance of the booster valve is unstable and a failure rate is high; moreover, one air compressor corresponds to one dual-fuel power device such as one turbine engine, and when the air compressor fails, the normal operation of the dual-fuel power device such as the turbine engine will be affected.

Figure 2:
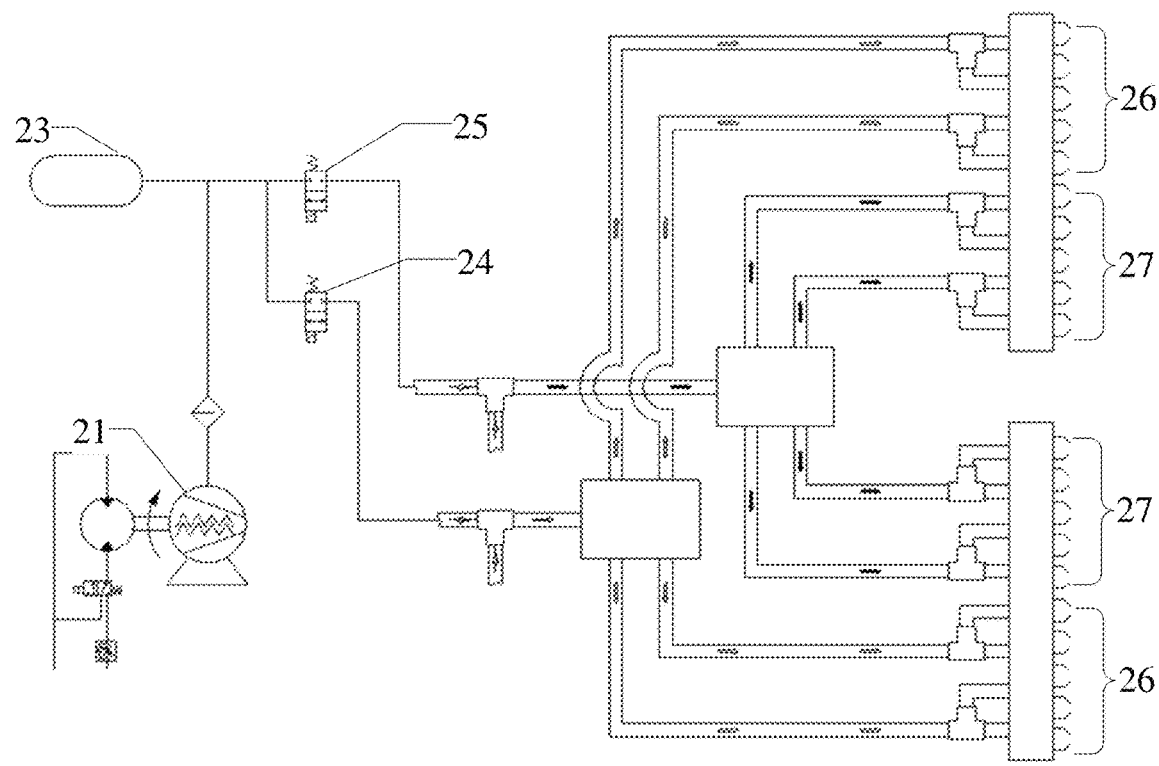
FIG. 2 is a schematic diagram of another dual-fuel power system.

FIG. 2 is a schematic diagram of another dual-fuel power system. As illustrated in FIG. 2, the dual-fuel power system includes a screw air compressor 21, an air storage cylinder 23, a liquid fuel nozzle electromagnetic valve 24, a gas fuel nozzle electromagnetic valve 25, a liquid fuel nozzle 26 and a gas fuel nozzle 27. The screw air compressor 21 compresses air and stores the compressed air in the air storage cylinder 23. The stored compressed air is controlled by the liquid fuel nozzle electromagnetic valve 24 and the gas fuel nozzle electromagnetic valve 25 to purge the liquid fuel nozzle 26 and the gas fuel nozzle 27, respectively.

The screw air compressor can output a maximum pressure of 200 PSI, with a large displacement, and the maximum displacement can reach 90 CFM at 200 PSI. By limiting the rotational speed of screw air compressor, the demand of smaller compressed air pressure value of purging system of dual-fuel power device can be met. However, the screw air compressor used for air supply and purging has the following disadvantages: (1) the screw air compressor has a large volume and weight, and in the case that it is installed on a single dual-fuel power device such as a single turbine fracturing device, a weight of a single device will increase, which will affect the layout and maintenance space of the single device. In addition, the filter elements and oil products of each air compressor need to be regularly maintained, which will take a lot of man-hours; (2) the high-temperature and high-pressure air discharged from the screw air compressor is cooled by the pipeline and air storage cylinders of the screw air compressor, and a large amount of condensed water will be generated in the air storage cylinders, so it is necessary to frequently discharge water from each air storage cylinder during operation, which brings great workload to the field operators; (3) the capacity of screw air compressor with large displacement has not been fully exerted; (4) one air compressor corresponds to one dual-fuel power device such as a turbine engine, and when the air compressor fails, it will affect the normal operation of the dual-fuel power device such as the turbine engine.

When the fracturing equipment finishes its work and the turbine engine is about to be shut down, if a temperature in a combustion chamber of the turbine engine cannot be reduced to a reasonable range and the fuel in an engine fuel nozzle cannot be completely drained, the engine fuel nozzle will also generate carbon deposit. The usual control mode is that after receiving a flameout instruction, an engine control module will run in a "cool down" mode for two minutes, that is to say, in a low-load operation state to reduce the temperature in the combustion chamber, and then to a state of flameout. Due to a different working conditions of the engine before flameout, the corresponding temperature in the combustion chamber is different, the two-minute "cool down" mode sometimes cannot reduce the temperature in the combustion chamber to an ideal temperature, and after the engine control module receives the flameout instruction, it stops purging the fuel nozzle, resulting in a small amount of fuel remaining in the fuel nozzle, and the engine fuel nozzle will also generate carbon deposit in this case.

Therefore, embodiments of the present disclosure provide a dual-fuel power system and its air supply and purging method. The dual-fuel power system includes a plurality of dual-fuel power devices, a first air compressor and a second air compressor. Each of the plurality of dual-fuel power devices includes a compressed air supply pipeline, a first fuel nozzle and a second fuel nozzle, the compressed air supply pipeline is connected with the first fuel nozzle and the second fuel nozzle, and the compressed air supply pipelines of the plurality of dual-fuel power devices are connected in sequence. The first air compressor includes a first air storage cylinder which is configured to be connected with the compressed air supply pipeline of any one of the plurality of dual-fuel power devices to supply air to the plurality of dual-fuel power devices and purge at least one of the first nozzle and the second nozzle. The second air compressor includes a second air storage cylinder, which is configured to be connected with the compressed air supply pipeline of any one of the plurality of dual-fuel power devices to supply air to the plurality of dual-fuel power devices and purge at least one of the first nozzle and the second nozzle. Therefore, when any one of the plurality of dual-fuel power devices is started to work, the first air compressor can be started in this case to supply air and purging the any one of the dual-fuel power devices. When the first air compressor fails, stops working or the air supply is insufficient, etc., which does not meet the requirements of the air supply pressure value, the second air compressor can be started to carry out the air supply and purging work for the air supply of the any one dual-fuel power device. Thus, affecting the normal operation of the plurality of dual-fuel power devices under the condition that the first air compressor cannot meet the requirements of air supply pressure value is avoided.

Hereinafter, the dual-fuel power system and its air supply and purging method provided by embodiments of the present disclosure will be described in detail with reference to the attached drawings.

Figure 3:
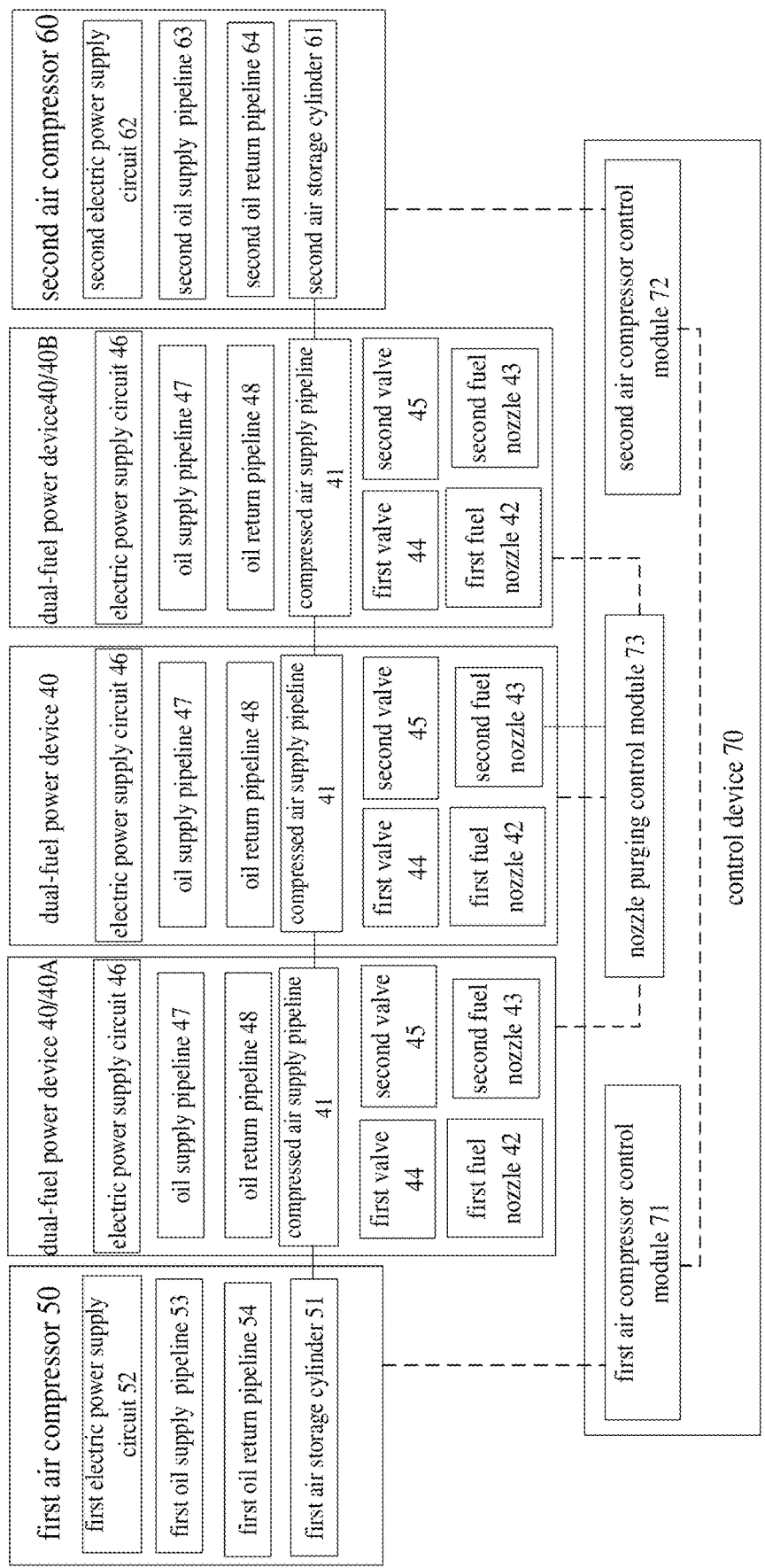
FIG. 3 is a schematic diagram of a dual-fuel power system according to an embodiment of the present disclosure.

An embodiment of the present disclosure provides a dual-fuel power system. FIG. 3 is a schematic diagram of a dual-fuel power system according to an embodiment of the present disclosure. As illustrated in FIG. 3, the dual-fuel power system 30 includes a plurality of dual-fuel power devices 40 (three dual-fuel power devices 40 are shown as examples, but the embodiments according to the present disclosure are not limited to thereto, and the number of dual-fuel power devices may be two or more than four), a first air compressor 50 and a second air compressor 60. Each of the plurality of dual-fuel power devices 40 includes a compressed air supply pipeline 41, a first fuel nozzle 42 and a second fuel nozzle 43. The compressed air supply pipeline 41 is connected with the first fuel nozzle 42 and the second fuel nozzle 43, and the compressed air supply pipelines 41 of the plurality of dual-fuel power devices 40 are connected in sequence. The first air compressor 50 includes a first air storage cylinder 51, which is configured to be connected with the compressed air supply pipeline 41 of any one of the plurality of dual-fuel power devices 40 to supply air to the plurality of dual-fuel power devices 40 and purge at least one of the first nozzle and the second nozzle. The second air compressor 60 includes a second air storage cylinder 61, which is configured to be connected with the compressed air supply pipeline 41 of any one of the plurality of dual-fuel power devices 40 to supply air to the plurality of dual-fuel power devices 40 and purge at least one of the first nozzle and the second nozzle.

For example, the plurality of dual-fuel power devices can be a plurality of turbine engines that provide power for oil field fracturing equipment, the first fuel nozzle can be a liquid fuel nozzle, the second fuel nozzle can be a gas fuel nozzle, the first air compressor can be a main air compressor, and the second air compressor can be an auxiliary air compressor as a backup air compressor of the main air compressor.

For example, a turbine engine as a power unit can be used to drive a generator or fracturing equipment, but the embodiments according to the present disclosure are not limited to thereto. In some examples, the turbine engine can also be integrated with the generator or fracturing equipment to form an integrated turbine generator or fracturing equipment.

In the dual-fuel power system provided by the disclosed embodiments, the compressed air supply pipelines of the plurality of dual-fuel power devices are connected in sequence, and the first air compressor and the second air compressor are connected with the compressed air supply pipelines of any one of the plurality of dual-fuel power devices, so that upon any one of the plurality of dual-fuel power devices starting to work, the first air compressor can be started in this case to supply air and purging the any one of the dual-fuel power devices. When the first air compressor fails, stops working or the air supply is insufficient, etc., which does not meet the requirements of the air supply pressure value, the second air compressor can be started to carry out the air supply and purging the any one dual-fuel power device. Affecting the normal operation of the plurality of dual-fuel power devices under the condition that the first air compressor cannot meet the requirements of air supply pressure value can be avoided.

In some examples, as illustrated in FIG. 3, the first air compressor 50 and the second air compressor 60 may be connected with the compressed air pipelines 41 of the first dual-fuel power device 40A and the last dual-fuel power device 40B among the plurality of dual-fuel power devices 40 connected in sequence, respectively. Here, "the plurality of dual-fuel power devices 40 connected in sequence" refers to the sequential connection of compressed air pipelines 41 of the plurality of dual-fuel power devices 40.

In some examples, as illustrated in FIG. 3, the dual-fuel power system 30 further includes a control device 70, which includes a first air compressor control module 71 and a second air compressor control module 72, which are in communicative connection with each other, and the first air compressor control module 71 is in communicative connection with the first air compressor 50, and is configured to control the starting and displacement of the first air compressor 50; the second air compressor control module 72 is in communicative connection with the second air compressor 60, and is configured to control the starting and displacement of the second air compressor 60.

It should be noted that the above communication connection can be realized by wired communication or wireless communication. Wired communication mode includes the communication connection between them through wires or optical fibers, and wireless communication mode includes wireless communication modes such as Wifi, mobile communication network or Bluetooth. In the case that the communication is connected by wireless communication mode, it can be understood that the above-mentioned modules or control devices can include wireless communication modules. The displacement of the first air compressor and the second air compressor is positively correlated with the pressure value of the air compressed by the first air compressor and the second air compressor, that is, the larger the displacement, the larger the pressure value of the compressed air; the smaller the displacement, the smaller the pressure of compressed air. By adjusting the displacement, the pressure value of compressed air can be adjusted, so as to obtain the compressed air with the pressure value meeting the demand of air supply and purging.

In some examples, as illustrated in FIG. 3, the first air compressor control module 71 is configured to control the first air compressor 50 to start when any one of the plurality of dual-fuel power devices 40 is started, and send a starting signal to the second air compressor control module 72 when the pressure value of the first air storage cylinder 51 is less than a first predetermined pressure value and the state of being less than the first predetermined pressure value continues for a predetermined time, and the second air compressor control module 72 controls the starting of the second air compressor 60 according to the starting signal. Therefore, when the first air compressor fails, stops working or the air supply is insufficient, etc., which does not meet the requirements of air supply pressure value and lasts for a predetermined time, the second air compressor can be started to carry out air supply and purging work on the any one dual-fuel power device, thus avoiding influencing the normal operation of the plurality of dual-fuel power devices in the case the first air compressor fails to meet the requirements of air supply pressure value.

For example, the first predetermined pressure value may be 200 PSI, and the embodiments of the present disclosure does not limit the size of the first predetermined pressure value.

For example, the predetermined time may be 2 minutes to 5 minutes, and the embodiments of the present disclosure does not limit the length of the predetermined time.

In some examples, as illustrated in FIG. 3, the first air compressor control module 71 is further configured to increase the displacement of the first air compressor 50 to increase the pressure value of the first air storage cylinder 51 when the pressure value of the first air storage cylinder 51 is less than the first predetermined pressure value.

For example, the first air compressor may further include a first hydraulic motor and a first hydraulic motor rotational speed control proportional valve for controlling the rotational speed of the first hydraulic motor, so that the rotational speed of the first hydraulic motor of the first air compressor can be adjusted by the first hydraulic motor rotational speed control proportional valve to increase the displacement of the first air compressor.

In some examples, as illustrated in FIG. 3, the second air compressor control module 72 is further configured to increase the displacement of the second air compressor 60 to increase the pressure value of the second air storage cylinder 61 when the pressure value of the second air storage cylinder 61 is less than the first predetermined pressure value.

For example, the second air compressor may further include a second hydraulic motor and a second hydraulic motor rotational speed control proportional valve for controlling the rotational speed of the second hydraulic motor, so that the rotational speed of the second hydraulic motor of the second air compressor can be adjusted by the second hydraulic motor rotational speed control proportional valve to increase the displacement of the second air compressor.

In some examples, as illustrated in FIG. 3, the first air compressor control module 71 is further configured to reduce the displacement of the first air compressor 50 to reduce the pressure value of the first air storage cylinder 51 when the pressure value of the first air storage cylinder 51 is greater than a second predetermined pressure value, the second predetermined pressure value is greater than or equal to the first predetermined pressure value. For example, the second predetermined pressure value is 10%-30% larger than the first predetermined pressure value, but the embodiments of the present disclosure are not limited thereto.

For example, the rotational speed of the first hydraulic motor of the first air compressor can be adjusted by the first hydraulic motor rotational speed control proportional valve to reduce the displacement of the first air compressor.

In some examples, as illustrated in FIG. 3, the second air compressor control module 72 is configured to reduce the displacement of the second air compressor 60 to reduce the pressure value of the second air storage cylinder 61 when the pressure value of the second air storage cylinder 61 is greater than the second predetermined pressure value. The second predetermined pressure value is greater than or equal to the first predetermined pressure value.

For example, the rotational speed of the second hydraulic motor of the second air compressor can be adjusted by the second hydraulic motor rotational speed control proportional valve to reduce the displacement of the second air compressor.

In some examples, at least one of the first air compressor and the second air compressor can be a screw air compressor. The screw air compressor has a large displacement, and can provide compressed air for the plurality of dual-fuel power devices while meeting the supply pressure value, thus improving the supply efficiency of the dual-fuel power system.

In some examples, as illustrated in FIG. 3, the control device 70 further includes a nozzle purging control module 73, each dual-fuel power device of the plurality of dual-fuel power devices 40 includes a first valve 44 and a second valve 45, the first valve 44 is located between the first fuel nozzle 42 and the compressed air supply pipeline, the second valve 45 is located between the second fuel nozzle 43 and the compressed air supply pipeline. The nozzle purging control module 73 is in communicative connection with the plurality of dual-fuel power devices 40 and is configured to control the opening and closing of the first valve 44 and the second valve 45.

For example, the first valve 44 may be an electromagnetic valve, and the second valve 45 may also be an electromagnetic valve. The disclosed embodiments do not limit the forms of the first valve and the second valve.

In some examples, as illustrated in FIG. 3, the nozzle purging control module 73 is configured to control the first valve 44 to close and the second valve 45 to open to purge the second fuel nozzle 43 when the first fuel nozzle 42 supplies fuel gas; the nozzle purging control module 73 is configured to control the first valve 44 to open and the second valve 45 to close to purge the first fuel nozzle 42 when the second fuel nozzle 43 supplies fuel gas. Therefore, compressed air can be used to purge the first fuel nozzle or the second fuel nozzle of the plurality of dual-fuel power devices, and carbon deposition can be prevented at the first fuel nozzle or the second fuel nozzle.

In some examples, as illustrated in FIG. 3, the nozzle purging control module 73 is configured to control the opening of the first valve 44 and the second valve 45 of the any one dual-fuel power device 40 to purge the first fuel nozzle 42 and the second fuel nozzle 43 simultaneously when any dual-fuel power device 40 of the plurality of dual-fuel power devices 40 receives a shutdown command and is in a low-load operation state. In the low-load operation state, although the first fuel nozzle and the second fuel nozzle have stopped supplying fuel to the power device, there is still residual-fuel in the pipeline and combustion chamber of the power device. By purging the first fuel nozzle and the second fuel nozzle, the fuel can be emptied, and carbon deposition caused by fuel residue at the first fuel nozzle and the second fuel nozzle can be prevented.

When the plurality of dual-fuel power devices need to stop working, the plurality of dual-fuel power devices will receive the shutdown command and immediately make preparations before shutdown. In this case, the plurality of dual-fuel power devices will enter the "cool down" mode, that is, low-load operation state to reduce the temperature in the combustion chambers of the plurality of dual-fuel power devices. If the purging on the first fuel nozzle and the second fuel nozzle is stopped in this case, a small amount of fuel will remain at the first fuel nozzle and the second fuel nozzle, resulting in carbon deposition.

In some examples, as illustrated in FIG. 3, the nozzle purging control module 73 is further configured to control the first valve 44 and the second valve 45 of any dual-fuel power device 40 to close to stop purging the first fuel nozzle 42 and the second fuel nozzle 43 when the exhaust temperature of the dual-fuel power device 40 is less than a predetermined temperature. Therefore, in this case the plurality of dual-fuel power devices receive the shutdown command and are in the low-load operation state, the purging control of the first fuel nozzle and the second fuel nozzle can be completed, and carbon deposition caused by fuel residue at the first fuel nozzle and the second fuel nozzle can be prevented.

The exhaust temperature of the dual-fuel power device is positively correlated with the temperature in the combustion chamber of the dual-fuel power device. The exhaust temperature of the dual-fuel power device can be monitored by an exhaust temperature sensor of the dual-fuel power device. When the exhaust temperature of the dual-fuel power device drops to the predetermined temperature, the temperature of the corresponding combustion chamber has dropped to a reasonable range. In this case, the fuel at the first fuel nozzle and the second fuel nozzle has been completely drained, so that the purging of the first fuel nozzle and the second fuel nozzle can be stopped.

In some examples, as illustrated in FIG. 3, each dual-fuel power device 40 of the plurality of dual-fuel power devices 40 further includes an electric power supply circuit 46, an oil supply pipeline 47 and an oil return pipeline 48; the first air compressor 50 also includes a first electric power supply circuit 52, a first oil supply pipeline 53 and a first oil return pipeline 54, which are respectively connected with the electric power supply circuit 46, the oil supply pipeline 47 and the oil return pipeline 48 of any one dual-fuel power device of the plurality of dual-fuel power devices 40. Therefore, it is possible to provide electric power supply, oil supply and oil return to the first air compressor from the electric power supply circuit, oil supply pipeline and oil return pipeline of the any one dual-fuel power device of the plurality of dual-fuel power devices. For example, the first air compressor 50 can be powered by the power of any one power device, so that there is no need to prepare a separate power system for the first air compressor. In some examples, in the case that the power device is a turbine engine, power sources (e.g., electric power and hydraulic oil) of some auxiliary devices (e.g., lubrication devices, etc.) of the turbine engine may be provided to the first air compressor 50.

In some examples, as illustrated in FIG. 3, the second air compressor 60 further includes a second electric power supply circuit 62, a second oil supply pipeline 63 and a second oil return pipeline 64, which are respectively connected with the electric power supply circuit 46, the oil supply pipeline 47 and the oil return pipeline 48 of any one dual-fuel power device of the plurality of dual-fuel power devices 40. Therefore, it is possible to provide electric power supply, oil supply and oil return to the second air compressor by the electric power supply circuit, oil supply pipeline and oil return pipeline of the dual-fuel power device of the plurality of dual-fuel power devices. For example, the second air compressor 60 can be powered by the power of any one power device, so that there is no need to prepare a separate power system for the second air compressor. In some examples, in the case that the power device is a turbine engine, power sources (e.g., electric power and hydraulic oil) of some auxiliary devices (e.g., lubrication devices, etc.) of the turbine engine may be provided to the second air compressor 60. For example, the electric power supply circuit, the oil supply pipeline and the oil return pipeline of the first air compressor 50 and the second air compressor 60 can be connected to the corresponding electric power supply circuit, oil supply pipeline and oil return pipeline of different power devices, or of the same power device.

Figure 4:
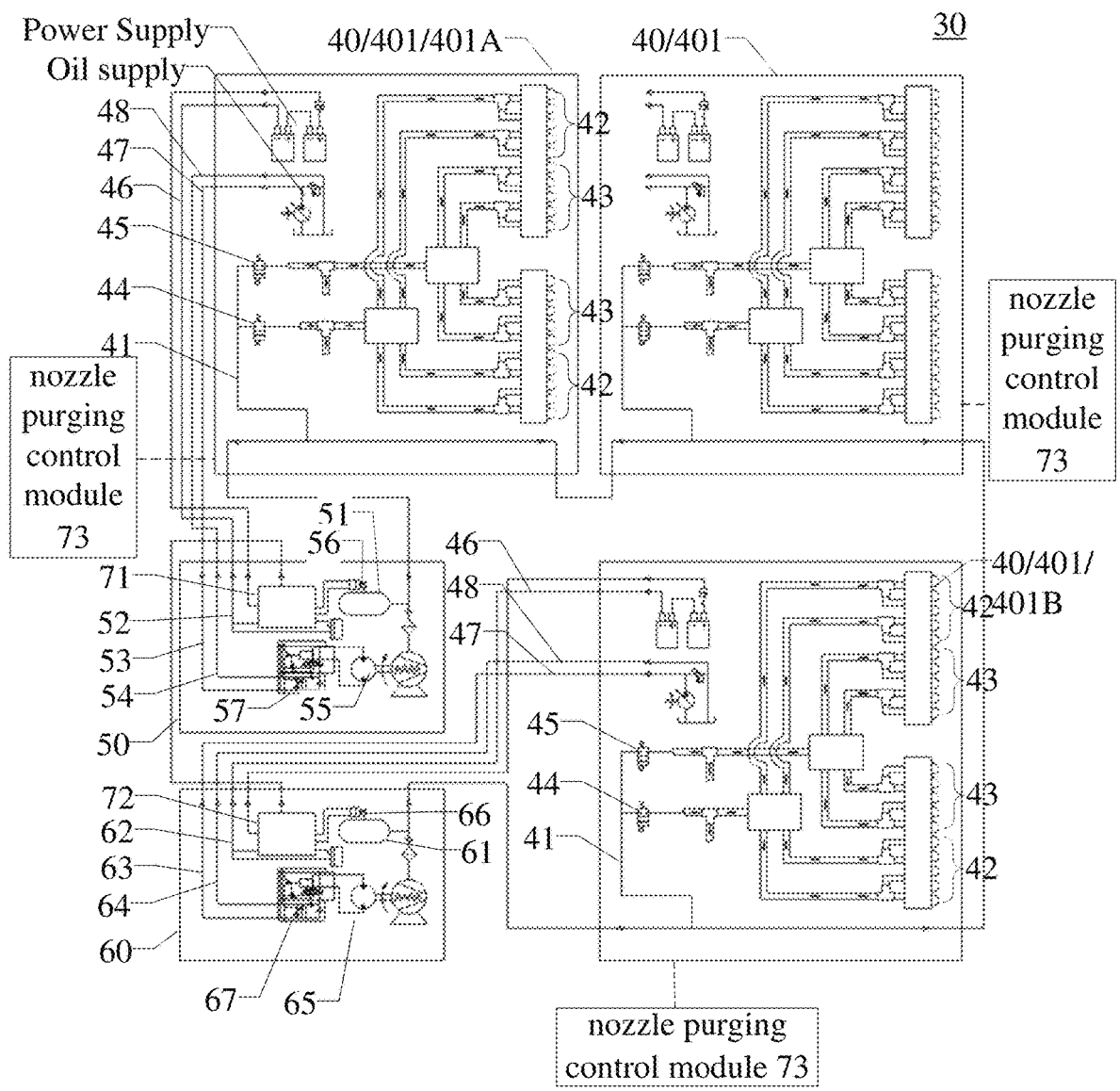
FIG. 4 is a schematic diagram of another dual-fuel power system according to an embodiment of the present disclosure.

FIG. 4 is a schematic diagram of another dual-fuel power system according to an embodiment of the present disclosure. As illustrated in FIG. 4, the dual-fuel power system 30 includes a plurality of dual-fuel power devices 40 (three turbine engines 401 are shown as an example), a first air compressor 50 and a second air compressor 60.

Each turbine engine 401 includes a compressed air supply pipeline 41, a first fuel nozzle 42, a second fuel nozzle 43, a first valve 44 and a second valve 45. Compressed air supply pipelines 41 of three turbine engines 401 are connected in sequence. The compressed air supply pipeline 41 is connected with the first fuel nozzle 41 and the second fuel nozzle 43, the first valve 44 is arranged between the compressed air supply pipeline 41 and the first fuel nozzle 42, and the second valve 45 is arranged between the compressed air supply pipeline 41 and the second fuel nozzle 43.

The dual-fuel power system 30 also includes a nozzle purging control module 73 which is in communication connection with three turbine engines 401 and configured to control the opening and closing of the first valve 44 and the second valve 45.

The first air compressor 50 is connected to the compressed air supply pipeline 41 of the first turbine engine 401A among the three turbine engines 401 connected in sequence, and the second air compressor 60 is connected to the compressed air supply pipeline 41 of the last turbine engine 401B among the three turbine engines 401 connected in sequence, so that the compressed air supply pipelines 41 of the three turbine engines 401 are connected with the first air compressor 50 and the second air compressor 60.

Each turbine engine 401 also includes an electric power supply circuit 46, an oil supply pipeline 47 and an oil return pipeline 48. The first air compressor 50 includes a first electric power supply circuit 52, a first oil supply pipeline 53 and a first oil return pipeline 54. The first electric power supply circuit 52, the first oil supply pipeline 53 and the first oil return pipeline 54 are respectively connected with the electric power supply circuit 46, the oil supply pipeline 47 and the oil return pipeline 48 of any one turbine engine 401 of the plurality of turbine engines 401, so that electric power supply, oil supply and oil return can be provided to the first air compressor 50 through the electric power supply circuit 46, the oil supply pipeline 47 and the oil return pipeline 48 of the any one turbine engine 401, and there is no need to prepare a separate power system for the first air compressor. For example, as illustrated in the figure, the first electric power supply circuit 52, the first oil supply pipeline 53 and the first oil return pipeline 54 are respectively connected with the electric power supply circuit 46, the oil supply pipeline 47 and the oil return pipeline 48 of the first turbine engine 401A among the three turbine engines 401 which are connected in sequence to provide electric power supply, oil supply and oil return to the first air compressor 50.

The second air compressor 60 includes a second electric power supply circuit 62, a second oil supply pipeline 63 and a second oil return pipeline 64. The second electric power supply circuit 62, the second oil supply pipeline 63 and the second oil return pipeline 64 are respectively connected with the electric power supply circuit 46, the oil supply pipeline 47 and the oil return pipeline 48 of any one turbine engine 401 of the three turbine engines 401, so that the second air compressor 60 can be supplied with electric power, oil supply and oil return through the electric power supply circuit 46, the oil supply pipeline 47 and the oil return pipeline 48 of the turbine engine 401 of the three turbine engines 401, and there is no need to prepare a separate power system for the second air compressor 60. As illustrated in the figure, the second electric power supply circuit 62, the second oil supply pipeline 63 and the second oil return pipeline 64 are respectively connected with the electric power supply circuit 46, the oil supply pipeline 47 and the oil return pipeline 48 of the last turbine engine 401B among the three turbine engines 401 which are connected in sequence to provide electric power supply, oil supply and oil return to the second air compressor 60.

The dual-fuel power system 30 also includes a first air compressor control module 71 and a second air compressor control module 72, which are in communicative connection with each other. A first air compressor control module 71 is in communicative connection with the first air compressor 50, and is configured to control the starting and displacement of the first air compressor 50; the second air compressor control module 72 is in communicative connection with the second air compressor 60, and is configured to control the starting and displacement of the second air compressor 60.

Before starting the turbine engine 401, it is necessary to select the type of fuel to be used. In this case, the nozzle purging control module 73 is configured to control the opening and closing of the first valve 44 and the second valve 45. For example, the nozzle purging control module 73 is configured to control the first valve 44 to close and the second valve 45 to open to purge the second fuel nozzle 43 when the first fuel nozzle 42 is supplied with fuel gas. For example, the nozzle purging control module 73 is configured to control the first valve 44 to open and the second valve 45 to close to purge the first fuel nozzle 42 when the second fuel nozzle 43 supplies fuel gas. Thereby, the purging preparation of the turbine engine 401 is completed.

The first air compressor control module 71 is configured to control the starting of the first air compressor 50 when any turbine engine 401 of the three turbine engines 401 is started, so that the air is compressed by the first air compressor 50 and then enters the turbine engine 401 for purging.

The first air compressor 50 further includes a first air storage cylinder 51, a first hydraulic motor 55, a first pressure sensor 56 and a first hydraulic motor rotational speed control proportional valve 57. The first air storage cylinder 51 is provided with the first pressure sensor 56 to monitor the pressure value of the first air storage cylinder 51. When the pressure value of the first air storage cylinder 51 is less than the first predetermined pressure value, the first air compressor control module 71 is configured to control the first hydraulic motor rotational speed control proportional valve 57 to increase the opening degree. Increasing the opening degree of the first hydraulic motor rotational speed control proportional valve 57 can increase the flow rate of hydraulic oil flowing to the first hydraulic motor 55, thereby increasing the rotational speed of the first hydraulic motor 55 and further increasing the displacement of the first air compressor 50. When the pressure value of the first air storage cylinder 51 is greater than the second predetermined pressure value, the first air compressor control module 71 is configured to control the first hydraulic motor rotational speed control proportional valve 57 to reduce the opening degree. Reducing the opening degree of the first hydraulic motor rotational speed control proportional valve 57 can reduce the flow of hydraulic oil flowing to the first hydraulic motor 55, thereby reducing the rotational speed of the first hydraulic motor 55 and further reducing the displacement of the first air compressor 50. The second predetermined pressure value is greater than or equal to the first predetermined pressure value. The first air compressor control module 71 controls the constant adjustment of the opening degree of the first hydraulic motor rotational speed control proportional valve 57, so that the pressure value of the first air storage cylinder 51 is always kept between the first predetermined pressure value and the second predetermined pressure value. When the second predetermined pressure value is equal to the first predetermined pressure value, the first air compressor control module 71 controls the constant adjustment of the opening degree of the first hydraulic motor rotational speed control proportional valve 57, so that the pressure value of the first air storage cylinder 51 is always kept at the first predetermined pressure value.

During the operation of three turbine engines 401, if the first air compressor 50 fails, stops working or the displacement decreases, the pressure value of the first air storage cylinder 51 of the first air compressor 50 will be lower than the first predetermined pressure value. When the first air compressor control module 71 monitors that the pressure value of the first air storage cylinder 51 is lower than the first predetermined pressure value and the state of being lower than the first predetermined pressure value keeps for a predetermined time, the first air compressor control module 71 sends a starting signal to the second air compressor control module 72, and the second air compressor control module 72 controls the starting of the second air compressor 60 according to the starting signal. Therefore, the requirement of air supply and purging for three turbine engines 401 can be met.

The second air compressor 60 further includes a second air storage cylinder 61, a second hydraulic motor 65, a second pressure sensor 66 and a second hydraulic motor rotational speed control proportional valve 67. After the second air compressor 60 is started, the second pressure sensor 66 installed on the second air storage cylinder 61 will monitor the pressure value of the second air storage cylinder 61. When the pressure value of the second air storage cylinder 61 is less than the first predetermined pressure value, the second air compressor control module 72 is configured to control the opening degree of the second hydraulic motor rotational speed control proportional valve 67 to increase the flow of hydraulic oil to the second hydraulic motor 65, thereby increasing the rotational speed of the second hydraulic motor 65 and further increasing the displacement of the second air compressor 60. When the pressure value of the second air storage cylinder 61 is greater than the second predetermined pressure value, the second air compressor control module 72 is configured to control the second hydraulic motor rotational speed control proportional valve 67 to reduce the opening degree. Reducing the opening degree of the second hydraulic motor rotational speed control proportional valve 67 can reduce the flow rate of hydraulic oil flowing to the second hydraulic motor 65, thereby reducing the rotational speed of the second hydraulic motor 65 and further reducing the displacement of the second air compressor 60. The second air compressor control module 72 controls the constant adjustment of the opening degree of the second hydraulic motor rotational speed control proportional valve 67, so that the pressure value of the second air storage cylinder 61 is always kept between the first predetermined pressure value and the second predetermined pressure value. When the second predetermined pressure value is equal to the first predetermined pressure value, the second air compressor control module 72 controls the constant adjustment of the opening degree of the second hydraulic motor rotational speed control proportional valve 67, so that the pressure value of the second air storage cylinder 61 is always kept at the first predetermined pressure value.

In the disclosed embodiments, the above-mentioned various modules can be implemented in software so as to be executed by various types of processors. For example, an executable code module can include one or more physical or logical blocks of computer instructions, which can be constructed as objects, procedures or functions, for example. However, the executable codes of various modules do not need to be physically located together, but can include different instructions stored in different physics. When these instructions are logically combined together, they constitute a module and achieve the specified purpose of the module.

Actually, the executable code module can be a single instruction or many instructions, and even can be distributed on many different code segments, among different programs, and across many memory devices. Similarly, the operation data can be identified within the module, and can be implemented in any suitable form and organized in any suitable type of data structure. The operation data can be collected as a single data set, or can be distributed in different locations (including different storage devices), and at least partially can only exist as electronic signals on the system or network.

In the case that the module can be realized by software, considering the level of existing hardware technology, the module that can be realized by software, without considering the cost, can be built by the technicians in the field with corresponding hardware circuits to realize the corresponding functions, including conventional very-large-scale integration (VLSI) circuits or gate arrays, existing semiconductors such as logic chips and transistors or other discrete components. The module can also be implemented with programmable hardware devices, such as field programmable gate arrays, programmable array logic, programmable logic devices, etc.

An embodiment of the disclosure provides a method for air supply and purging of a dual-fuel power system. FIG. 5 is a schematic diagram of an air supply and purging method of a dual-fuel power system provided by an embodiment of the disclosure. The method of air supply and purging can be applied to the dual-fuel power system provided by any one of the above embodiments. As illustrated in FIG. 5, the air supply and purging method includes the following steps:

S1: when any one dual-fuel power device of the plurality of dual-fuel power devices is started, starting the first air compressor to supply air to the any one dual-fuel power device;

S2: when the pressure value of the first air storage cylinder is less than the first predetermined pressure value and the state of being than the first predetermined pressure value for a predetermined time, starting the second air compressor to supply air to the any one dual-fuel power device.

For example, the plurality of dual-fuel power devices can be a plurality of turbine engines for powering oil field fracturing equipment, the compressed air supply pipelines of the plurality of dual-fuel power devices are connected in sequence, and the first air compressor and the second air compressor are connected with the compressed air supply pipelines of any one dual-fuel power device of the plurality of dual-fuel power devices, so that the first air compressor and the second air compressor can supply air for the plurality of dual-fuel power devices. The first air compressor may be a main air compressor, and the second air compressor may be an auxiliary air compressor as a backup air compressor of the main air compressor.

For example, a turbine engine as a power unit can be used to drive a generator or fracturing equipment, but embodiments according to the present disclosure are not limited thereto. In some examples, the turbine engine can also be integrated with the generator or fracturing equipment to form an integrated turbine generator or fracturing equipment.

In the air supply and purging method of the dual-fuel power system provided by the embodiments of the present disclosure, when any dual-fuel power device of the plurality of dual-fuel power devices is started, the first air compressor is started to supply air to the dual-fuel power device. When the pressure value of the first air storage cylinder is less than the first predetermined pressure value and the state of being less than the first predetermined pressure value keeps for a predetermined time, the second air compressor is started to supply air to the dual-fuel power device. Therefore, when the first air compressor fails, stops working or the air supply is insufficient, etc., which does not meet the requirements of air supply pressure value and lasts for a predetermined time, the second air compressor can be started to carry out air supply and purging work on the any one dual-fuel power device, thus avoiding influencing the normal operation of the plurality of dual-fuel power devices when the first air compressor fails to meet the requirements of air supply pressure value.

For example, the first predetermined pressure value may be 200 PSI, and the embodiments of the present disclosure does not limit the size of the first predetermined pressure value.

For example, the predetermined time may be 2 minutes to 5 minutes, and the embodiments of the present disclosure does not limit the length of the predetermined time.

In some examples, in the air supply and purging method, when the pressure value of the first air storage cylinder is less than the first predetermined pressure value, the displacement of the first air compressor is increased to increase the pressure value of the first air storage cylinder.

For example, the first air compressor may further include a first hydraulic motor and a first hydraulic motor rotational speed control proportional valve for controlling the rotational speed of the first hydraulic motor, so that the rotational speed of the first hydraulic motor of the first air compressor can be adjusted by the first hydraulic motor rotational speed control proportional valve to increase the displacement of the first air compressor.

In some examples, the air supply and purging method may further include increasing the displacement of the second air compressor to increase the pressure value of the second air storage cylinder when the pressure value of the second air storage cylinder is less than the first predetermined pressure value.

For example, the second air compressor may further include a second hydraulic motor and a second hydraulic motor rotational speed control proportional valve for controlling the rotational speed of the second hydraulic motor, so that the rotational speed of the second hydraulic motor of the second air compressor can be adjusted by the second hydraulic motor rotational speed control proportional valve to increase the displacement of the second air compressor.

In some examples, the air supply and purging method may further include reducing the displacement of the first air compressor to reduce the pressure value of the first air storage cylinder when the pressure value of the first air storage cylinder is greater than the second predetermined pressure value.

For example, the rotational speed of the first hydraulic motor of the first air compressor can be adjusted by the first hydraulic motor rotational speed control proportional valve to reduce the displacement of the first air compressor.

In some examples, the air supply and purging method may further include reducing the displacement of the second air compressor to reduce the pressure value of the second air storage cylinder when the pressure value of the second air storage cylinder is greater than the second predetermined pressure value.

For example, the rotational speed of the second hydraulic motor of the second air compressor can be adjusted by the second hydraulic motor rotational speed control proportional valve to reduce the displacement of the second air compressor.

In some examples, at least one of the first air compressor and the second air compressor can be a screw air compressor. The screw air compressor has a large displacement, and can provide compressed air for the plurality of dual-fuel power devices upon meeting the air supply pressure value, thus improving the supply efficiency of the dual-fuel power system.

In some examples, the air supply and purging method may further include purging the second fuel nozzle of any one dual-fuel power device of the plurality of dual-fuel power devices when the any one dual-fuel power device provides fuel through the first fuel nozzle; purging the first fuel nozzle of any one dual-fuel power device of the plurality of dual-fuel power devices when the any one dual-fuel power device provides fuel through the second fuel nozzle. Therefore, compressed air can be used to purge the first fuel nozzle or the second fuel nozzle of the plurality of dual-fuel power devices, and carbon deposition can be prevented at the first fuel nozzle or the second fuel nozzle.

In some examples, the air supply and purging method may further include purging the first fuel nozzle and the second fuel nozzle of the any one dual-fuel power device simultaneously when any one dual-fuel power device of the plurality of dual-fuel power devices receives a shutdown command and is in a low-load operation state. In the low-load operation state, although the first fuel nozzle and the second fuel nozzle have stopped supplying fuel to the power device, there is still residual fuel in the pipeline and combustion chamber of the power device. By purging the first fuel nozzle and the second fuel nozzle, the fuel can be emptied, and carbon deposition caused by fuel residue at the first fuel nozzle and the second fuel nozzle can be prevented.

When the plurality of dual-fuel power devices need to stop working, the plurality of dual-fuel power devices will receive the shutdown command and immediately make preparations before shutdown. In this case, the plurality of dual-fuel power devices will enter the "cool down" mode, that is, low-load operation state to reduce the temperature in the combustion chambers of the plurality of dual-fuel power devices. If the purging of the first fuel nozzle and the second fuel nozzle is stopped in this case, a small amount of fuel will remain at the first fuel nozzle and the second fuel nozzle, resulting in carbon deposition.

In some examples, the air supply and purging method may further include: stopping purging the first fuel nozzle and the second fuel nozzle of any one of the plurality of dual-fuel power devices when the exhaust temperature of the dual-fuel power device is less than or equal to a predetermined temperature. Therefore, when the plurality of dual-fuel power devices receive the shutdown command and are in the low-load operation state, the purging control of the first fuel nozzle and the second fuel nozzle can be realized, and carbon deposition caused by fuel residue at the first fuel nozzle and the second fuel nozzle can be prevented.

The exhaust temperature of the dual-fuel power device is positively correlated with the temperature in the combustion chamber of the dual-fuel power device. The exhaust temperature of the dual-fuel power device can be monitored by an exhaust temperature sensor of the dual-fuel power device. When the exhaust temperature of the dual-fuel power device drops to the predetermined temperature, the temperature of the corresponding combustion chamber has dropped to a reasonable range. In this case, the fuel at the first fuel nozzle and the second fuel nozzle has been completely drained, so that the purging of the first fuel nozzle and the second fuel nozzle can be stopped.

In some examples, in the air supply and purging method, the electric power supply circuits, oil supply pipelines and oil return pipelines of at least one of the first air compressor and the second air compressor are respectively connected with the electric power supply circuits, oil supply pipelines and oil return pipelines of the plurality of dual-fuel power devices. Therefore, it is possible to provide electric power supply, oil supply and oil return to at least one of the first air compressor and the second air compressor by the electric power supply circuit, oil supply pipeline and oil return pipeline of any one dual-fuel power device of the plurality of dual-fuel power devices. For example, the power of at least one of the first air compressor and the second air compressor can adopt the power of any one power device, so that there is no need to prepare a separate power system for at least one of the first air compressor and the second air compressor. In some examples, in the case that the power device is a turbine engine, the power source (e.g., electric power and hydraulic oil) of some auxiliary devices (e.g., lubrication devices, etc.) of the turbine engine may be provided to at least one of the first air compressor and the second air compressor. For example, the power supply circuits and oil supply/oil return pipelines of the first air compressor and the second air compressor can be connected to the corresponding power supply circuits and oil supply/oil return pipelines of different power devices, or to the corresponding power supply circuits and oil supply/oil return pipelines of the same power device.

An embodiment of the present disclosure provides another air supply and purging method of the dual-fuel power system. The air supply and purging method can be applied to the dual-fuel power system provided by any one of the above embodiments. The air supply and purging method includes the following steps:

S100: Connecting a compressed air supply pipeline of each dual-fuel power device of a plurality of dual-fuel power devices in sequence;

S101: Connecting a first air compressor with a first dual-fuel power device among the plurality of dual-fuel power devices connected in sequence;

S102: Connecting an oil supply pipeline and an oil return pipeline of the first air compressor with an oil supply pipeline and an oil return pipeline of any one dual-fuel power device of the plurality of dual-fuel power devices, respectively;

S103: Selecting a fuel supply type, purging the second fuel nozzle upon supplying fuel to the first fuel nozzle; and purging the first fuel nozzle upon supplying fuel to the second fuel nozzle;

S104: when any one dual-fuel power device of the plurality of dual-fuel power devices is started, starting the first air compressor to supply air to the plurality of dual-fuel power devices. In this case, the first fuel nozzle of the any one dual-fuel power device sprays combustion medium for doing work, and the second fuel nozzle sprays compressed air to eliminate nozzle carbon deposition;

S105: when a pressure value of a first air storage cylinder is less than a first predetermined pressure value, calling the pressure value of the first air storage cylinder, and outputting prompting information;

S106: responding to the prompting information, increasing the displacement of the first air compressor to increase the pressure value of the first air storage cylinder;

S107: calling the pressure value of the first air storage cylinder, and connecting an oil supply pipeline and an oil return pipeline of the second air compressor with an oil supply pipeline and an oil return pipeline of any one dual-fuel power device of the plurality of dual-fuel power devices respectively when the pressure value of the first air storage cylinder is less than the first predetermined pressure value and the state of being less than the first predetermined pressure value keeps for a predetermined time;

S108: responding to the prompting information, starting the second air compressor to supply air to the plurality of dual-fuel power devices;

S109: calling the pressure value of the second air storage cylinder, and outputting prompting information when the pressure value of the second air storage cylinder is less than the first predetermined pressure value.

S110: responding to the prompting information, increasing the displacement of the second air compressor to increase the pressure value of the second air storage cylinder until the prompting information disappears;

S111: when any one dual-fuel power device of the plurality of dual-fuel power devices receives a shutdown command and is in a low-load operation state, purging the first fuel nozzle and the second fuel nozzle of the any one dual-fuel power device simultaneously;

S112: when the exhaust temperature of any one dual-fuel power device of the plurality of dual-fuel power devices is less than or equal to a predetermined temperature, stopping purging the first fuel nozzle and the second fuel nozzle of the any one dual-fuel power device.

The following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, features in one embodiment or in different embodiments of the present disclosure can be combined.

The foregoing is only the preferred embodiments of the present disclosure and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present invention shall be defined by the appended claims.

What is claimed is:

1. A dual-fuel power system, comprising:
three or more dual-fuel engines, each of the three or more dual-fuel engines comprising a compressed air supply pipeline, a first fuel nozzle and a second fuel nozzle, the compressed air supply pipeline being connected with the first fuel nozzle and the second fuel nozzle, and the compressed air supply pipelines of the three or more dual-fuel engines being connected to a main purging pipeline sequentially;
a first air compressor comprising a first air storage cylinder configured to be connected to the main purging pipeline from a first of two ends of the main purging pipeline to supply air to purge at least one of the first fuel nozzle and the second fuel nozzle of each of the three or more dual-fuel engines; and
a second air compressor comprising a second air storage cylinder configured to be connected to the main purging pipeline from a second of the two ends of the main purging pipeline to supply air to purge at least one of the first fuel nozzle and the second fuel nozzle of each of the three or more dual-fuel engines,
wherein the first air compressor and the second air compressor are combined to purge the three or more dual-fuel engines from the two ends of the main purging pipeline.

2. The dual-fuel power system according to claim 1, further comprising:
a control device comprising a first air compressor control circuit and a second air compressor control circuit,
wherein the first air compressor control circuit and the second air compressor control circuit are in communicative connection with each other,
the first air compressor control circuit is in communicative connection with the first air compressor, and is configured to control starting and air displacement of the first air compressor;

the second air compressor control circuit is in communicative connection with the second air compressor, and is configured to control starting and air displacement of the second air compressor.

3. The dual-fuel power system according to claim 2, wherein
the first air compressor control circuit is configured to control the first air compressor to start when any one of the three or more dual-fuel engines is started, and send a starting signal to the second air compressor control circuit when a pressure value of the first air storage cylinder is continuously less than a first predetermined pressure value for a predetermined time indicating a potential failure of the first air compressor; and
the second air compressor control circuit is configured to control the second air compressor to start according to the starting signal.

4. The dual-fuel power system according to claim 3, wherein the first air compressor control circuit is further configured to increase the air displacement of the first air compressor to increase the pressure value of the first air storage cylinder when the pressure value of the first air storage cylinder is less than the first predetermined pressure value.

5. The dual-fuel power system according to claim 3, wherein the second air compressor control circuit is further configured to increase the air displacement of the second air compressor to increase a pressure value of the second air storage cylinder when the second air compressor has been started and the pressure value of the second air storage cylinder is less than the first predetermined pressure value.

6. The dual-fuel power system according to claim 3, wherein:
the first air compressor control circuit is further configured to reduce the air displacement of the first air compressor to reduce the pressure value of the first air storage cylinder when the pressure value of the first air storage cylinder is greater than a second predetermined pressure value; and/or, the second air compressor control circuit is configured to reduce the air displacement of the second air compressor to reduce the pressure value of the second air storage cylinder when the pressure value of the second air storage cylinder is greater than the second predetermined pressure value; and
the second predetermined pressure value is greater than or equal to the first predetermined pressure value.

7. The dual-fuel power system according to claim 2, wherein:
in the control device further comprises a nozzle purging control circuit, and each of the three or more dual-fuel engines comprises a first valve and a second valve, the first valve is located between the first fuel nozzle and the compressed air supply pipeline, the second valve is located between the second fuel nozzle and the compressed air supply pipeline; and
the nozzle purging control circuit is in communicative connection with the three or more dual-fuel engines and configured to control opening and closing of the first valve and the second valve.

8. The dual-fuel power system according to claim 7, wherein,
the nozzle purging control circuit is configured to control the first valve to close and the second valve to open so as to purge the second fuel nozzle when the first fuel nozzle supplies fuel gas; and the nozzle purging control circuit is configured to control the first valve to open and the second valve to close so as to purge the first fuel nozzle when the second fuel nozzle supplies fuel gas.

9. The dual-fuel power system according to claim 7, wherein, when any one of the three or more dual-fuel engines receives a shutdown command and is in a low-load operation state, the nozzle purging control circuit is configured to control the opening of the first valve and the second valve of the any one of the three or more dual-fuel engines to purge the first fuel nozzle and the second fuel nozzle simultaneously.

10. The dual-fuel power system according to claim 9, wherein the nozzle purging control circuit is further configured to control the first valve and the second valve of the any one of the three or more dual-fuel engines to close so as to stop purging the first fuel nozzle and the second fuel nozzle when an exhaust temperature of the any one of the three or more dual-fuel engines is less than a predetermined temperature.

11. The dual-fuel power system according to claim 1, wherein:
each of the three or more dual-fuel engines further comprises an electric power supply circuit, an oil supply pipeline and an oil return pipeline; and
the first air compressor further comprises a first electric power supply circuit, a first oil supply pipeline and a first oil return pipeline, and the first electric power supply circuit, the first oil supply pipeline and the first oil return pipeline are respectively connected with the electric power supply circuit, the oil supply pipeline, and the oil return pipeline of any one of the three or more dual-fuel engines; and/or, the second air compressor further comprises a second electric power supply circuit, a second oil supply pipeline and a second oil return pipeline, and the second electric power supply circuit, the second oil supply pipeline and the second oil return pipeline are respectively connected with the electric power supply circuit, the oil supply pipeline and the oil return pipeline of any one of the three or more dual-fuel engines.

12. The dual-fuel power system according to claim 1, wherein at least one of the three or more dual-fuel engines comprises a turbine engine.

13. An air supply and purging method comprising:
providing a dual-fuel power system, the dual power system comprising:
three or more dual-fuel power engines, each of the three or more dual-fuel power engines comprising a compressed air supply pipeline, a first fuel nozzle and a second fuel nozzle, the compressed air supply pipeline being connected with the first fuel nozzle and the second fuel nozzle, and the compressed air supply pipelines of the three or more dual-fuel power engines being connected to a main purging pipeline sequentially;
a first air compressor comprising a first air storage cylinder configured to be connected to the main purging pipeline from a first of two ends of the main purging pipeline to supply air to purge at least one of the first fuel nozzle and the second fuel nozzle of each of the three or more dual-fuel power engines; and
a second air compressor comprising a second air storage cylinder configured to be connected to the main purging pipeline from a second of two ends of the main purging pipeline to supply air to purge at least one of the first fuel nozzle and the second fuel nozzle of each of the three or more dual-fuel power engines, wherein the first air compressor and the second air compressor are combined to purge the three or more dual-fuel engines from the two ends of the main purging line;

when any one of the three or more dual-fuel power engines devices is started, starting the first air compressor to supply air to the any one of the three or more dual-fuel power engines; and when a pressure value of the first air storage cylinder is continuously less than a first predetermined pressure value for a predetermined time, starting the second air compressor to supply air to the any one of three or more dual-fuel power engines.

14. The air supply and purging method according to claim 13, further comprising: when the pressure value of the first air storage cylinder is less than the first predetermined pressure value, increasing air displacement of the first air compressor so as to increase the pressure value of the first air storage cylinder.

15. The air supply and purging method according to claim 13, further comprising:

when the second air compressor has been started and a pressure value of the second air storage cylinder is less than the first predetermined pressure value, increasing air displacement of the second air compressor so as to increase the pressure value of the second air storage cylinder.

16. The air supply and purging method according to claim 13, further comprising:

when the pressure value of the first air storage cylinder is greater than a second predetermined pressure value, reducing air displacement of the first air compressor so as to reduce the pressure value of the first air storage cylinder; and/or, when the pressure value of the second air storage cylinder is greater than the second predetermined pressure value, reducing air displacement of the second air compressor so as to reduce the pressure value of the second air storage cylinder.

17. The air supply and purging method according to claim 13, further comprising:

when any one of the three or more dual-fuel engines provides fuel through the first fuel nozzle, purging the second fuel nozzle of the any one of the three or more dual-fuel engines;

when any one of the three or more dual-fuel engines provides fuel through the second fuel nozzle, purging the first fuel nozzle of the any one of the three or more dual-fuel engines.

18. The air supply and purging method according to claim 13, further comprising:

when any one of the three or more dual-fuel engines receives a shutdown command and is in a low-load operation state, purging the first fuel nozzle and the second fuel nozzle of the any one of the three or more dual-fuel engines simultaneously.

19. The air supply and purging method according to claim 18, further comprising:

when an exhaust temperature of any one of the three or more dual-fuel engines is less than or equal to a predetermined temperature, stopping purging the first fuel nozzle and the second fuel nozzle of the any one of the three or more dual-fuel engines.

* * * * *

UNITED STATES PATENT AND TRADEMARK OFFICE
CERTIFICATE OF CORRECTION

| | |
|---|---|
| PATENT NO. | : 12,410,754 B2 |
| APPLICATION NO. | : 17/774116 |
| DATED | : May 3, 2022 |
| INVENTOR(S) | : Jianwei Wang et al. |

Page 1 of 1

It is certified that error appears in the above-identified patent and that said Letters Patent is hereby corrected as shown below:

In the Claims

In Column 23, Claim 13, Line 8, delete "devices".

In Column 23, Claim 13, Line 6, delete "line" and insert -- pipeline --.

In Column 23, Claim 13, Line 14, insert -- the -- before "three".

Signed and Sealed this
Eighteenth Day of November, 2025

John A. Squires
*Director of the United States Patent and Trademark Office*